(12) United States Patent
Park et al.

(10) Patent No.: US 11,636,300 B2
(45) Date of Patent: Apr. 25, 2023

(54) MARK SUBSTRATE, WINDOW COVER INCLUDING MARK AND DISPLAY DEVICE INCLUDING THE SAME

(71) Applicant: Samsung Display Co., Ltd., Yongin-Si (KR)

(72) Inventors: Jintaek Park, Uiwang-si (KR); Jong-Won Choo, Seongnam-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 44 days.

(21) Appl. No.: 17/236,132

(22) Filed: Apr. 21, 2021

(65) Prior Publication Data

US 2022/0044086 A1 Feb. 10, 2022

(30) Foreign Application Priority Data

Aug. 4, 2020 (KR) .................. 10-2020-0097629

(51) Int. Cl.
*G06K 19/06* (2006.01)
*G06K 19/077* (2006.01)

(52) U.S. Cl.
CPC ... *G06K 19/0614* (2013.01); *G06K 19/06037* (2013.01); *G06K 19/07707* (2013.01)

(58) Field of Classification Search
None
See application file for complete search history.

(56) References Cited

U.S. PATENT DOCUMENTS

2015/0241721 A1* 8/2015 Tanabe .............. G02F 1/133512
349/61
2017/0186824 A1* 6/2017 Lee ..................... H01L 27/3258

FOREIGN PATENT DOCUMENTS

| CN | 109102761 A | * | 12/2018 | ............ G09F 9/00 |
| CN | 109102761 B | * | 1/2021 | ............ G09F 9/00 |
| KR | 101076422 B1 | | 10/2011 | |
| KR | 102086579 B1 | | 4/2020 | |

* cited by examiner

*Primary Examiner* — Kristy A Haupt
(74) *Attorney, Agent, or Firm* — Cantor Colburn LLP

(57) ABSTRACT

A mark substrate includes a base substrate, a light-blocking layer disposed on the base substrate, where an opening or a groove is defined in the light-blocking layer, and an infrared-transmitting member. At least a portion of the infrared-transmitting member is disposed in the opening or the groove of the light-blocking layer to define a mark having a two-dimensional shape and optically distinguished from an adjacent area.

19 Claims, 10 Drawing Sheets

MARK SUBSTRATE, WINDOW COVER INCLUDING MARK AND DISPLAY DEVICE INCLUDING THE SAME

This application claims priority to Korean Patent Application No. 10-2020-0097629, filed on Aug. 4, 2020, and all the benefits accruing therefrom under 35 U.S.C. § 119, the content of which in its entirety is herein incorporated by reference.

BACKGROUND

1. Field

Embodiments relate to a mark substrate. More particularly, embodiments relate to a mark substrate, a window cover including a mark and a display device including the window cover.

2. Description of the Related Art

A display device typically includes a display panel and a window cover for protecting the display panel.

An alignment mark may be used for verifying and adjusting alignment positions in a process of combining the display panel with the window cover or in another assembling process. Furthermore, an identification mark such as a QR code may be used for verifying a source information of a component or the like.

SUMMARY

Embodiments provide a mark substrate.

Embodiments provide a window cover including a mark.

Embodiments provide a display device including a window cover with a mark.

According to an embodiment, a mark substrate includes a base substrate, a light-blocking layer disposed on the base substrate, where an opening or a groove is defined in the light-blocking layer, and an infrared-transmitting member. In such an embodiment, at least a portion of the infrared-transmitting member is disposed in the opening or the groove of the light-blocking layer to define a mark having a two-dimensional shape and optically distinguished from an adjacent area.

In an embodiment, the light-blocking layer may include a first light-blocking layer and a second light-blocking layer disposed on the first light-blocking layer.

In an embodiment, a width of an opening of the first light-blocking layer may be less than a width of an opening of the second light-blocking layer.

In an embodiment, a width of an opening of the first light-blocking layer may be greater than a width of an opening of the second light-blocking layer.

In an embodiment, an infrared ray transmittance of the infrared-transmitting member may be about 80% or greater, and a visible ray transmittance of the infrared-transmitting member may be about 10% or less.

In an embodiment, the infrared-transmitting member may include a coloring agent.

In an embodiment, a portion of the infrared-transmitting member may cover an upper surface of the light-blocking layer.

In an embodiment, the mark may have a shape of an alignment mark.

In an embodiment, the mark may be an identification mark including an information.

In an embodiment, the identification mark is a QR code.

According to an embodiment, a window cover includes a base substrate, a light-blocking layer disposed on the base substrate and surrounding a transmitting area of the base substrate, and an infrared-transmitting member. In such an embodiment, at least a portion of the infrared-transmitting member is inserted into the light-blocking layer to define a mark having a two-dimensional shape and optically distinguished from an adjacent area.

According to an embodiment, a display device includes a window cover including a light-blocking area and a transmitting area, and a display panel combined with the window cover and overlapping the transmitting area. In such an embodiment, the window cover includes a base substrate, a light-blocking layer disposed on the base substrate and overlapping the light-blocking area, and an infrared-transmitting member. In such an embodiment, at least a portion of the infrared-transmitting member is inserted into the light-blocking layer to define a mark having a two-dimensional shape and optically distinguished from an adjacent area.

According to embodiments of the invention, at least a portion of an infrared-transmitting member, which defines a two-dimensional shaped mark, is inserted into a light-blocking layer. Thus, a durability and a reliability of the mark may be increased.

In such embodiments, an alignment mark using the infrared-transmitting member may be recognized with a higher accuracy by a sensor, when compared to a conventional alignment mark formed using a white ink. Thus, an accuracy of an assembling process may be increased.

In such embodiments, since the infrared-transmitting member substantially blocks a visible ray, the infrared-transmitting member may not be perceived by a user. Thus, an external aesthetic sensibility of a display device including the window cover may be effectively prevented from being deteriorated.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
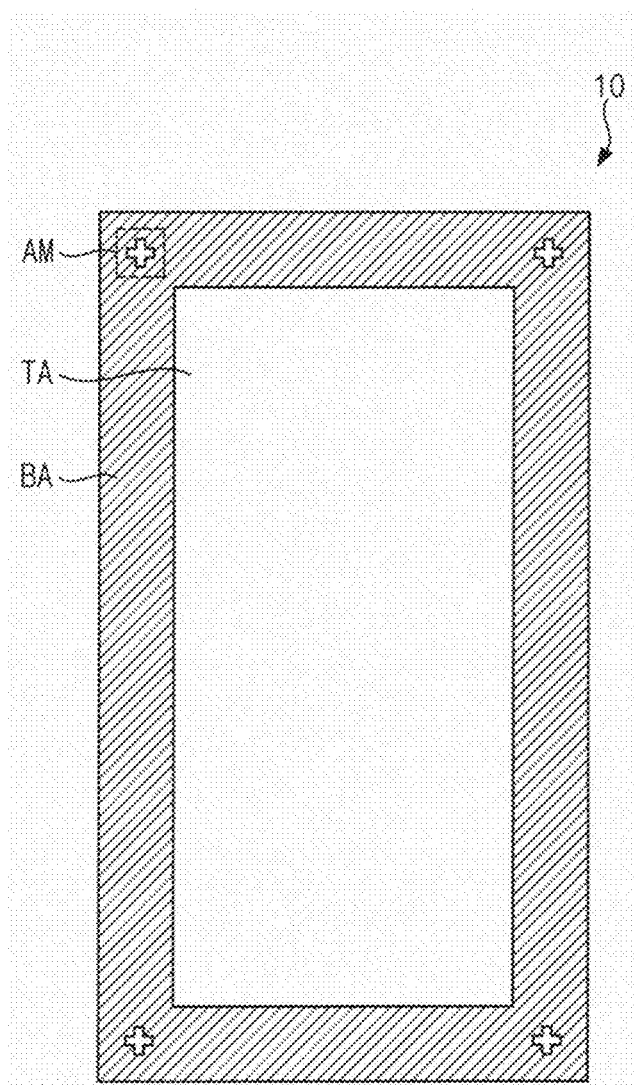
FIG. 1 is a plan view illustrating a window cover according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a mark substrate, a window cover and a display device according to the invention will be described in detail with reference to the accompanying drawings.

Figure 2:
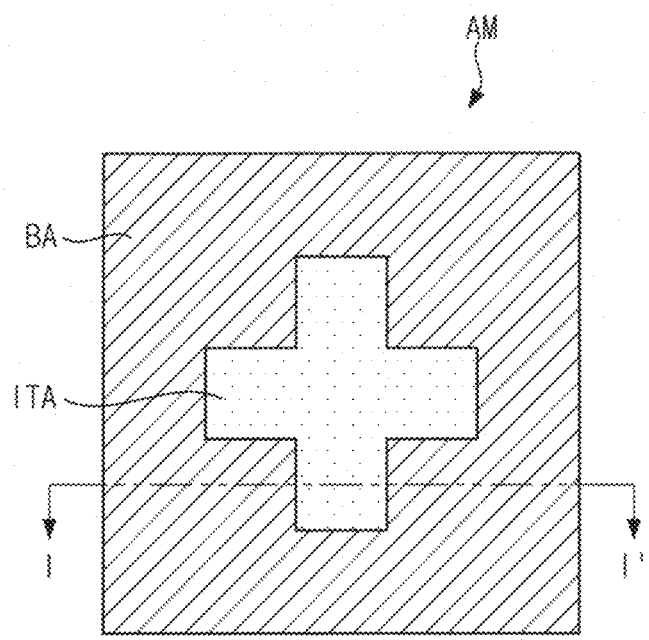
FIG. 2 is an enlarged plan view illustrating an alignment mark of a window cover of FIG. 1.
Figure 3:
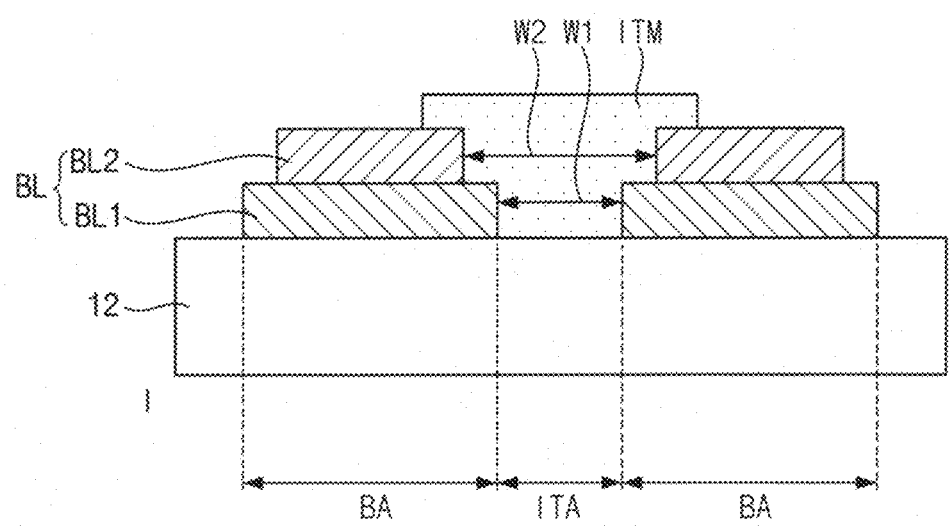
FIG. 3 is a cross-sectional view taken along line I-I' of FIG. 2.

FIG. 1 is a plan view illustrating a window cover according to an embodiment. FIG. 2 is an enlarged plan view illustrating an alignment mark of a window cover of FIG. 1. FIG. 3 is a cross-sectional view taken along line I-I' of FIG. 2.

Referring to FIG. 1, an embodiment of a window cover 10 includes a light-transmitting area TA and a light-blocking area BA adjacent to the light-transmitting area TA, in a plan view. In an embodiment, the light-blocking area BA may surround the light-transmitting area TA.

In an embodiment, the window cover 10 includes an alignment mark AM. The alignment mark AM may be used for obtaining a position information of the window cover 10 or a display panel or for verifying alignment of the window cover 10 and the display panel. The alignment mark AM may be disposed or defined in the light-blocking area BA. In one embodiment, for example, a plurality of alignment marks AM may be spaced apart from each other in the light-blocking area BA. The alignment marks AM may be adjacent to corners of the window cover 10, respectively. However, embodiments are not limited thereto. Alternatively, the alignment marks AM may be variously modified to be disposed in another position.

Referring to FIG. 2, the alignment mark AM may include an infrared-transmitting area ITA. In a plan view, the infrared-transmitting area ITA may be surrounded by the light-blocking area BA. The infrared-transmitting area ITA may selectively transmit an infrared ray. Thus, the infrared-transmitting area ITA may be optically distinguishable from an adjacent area, for example, the light-blocking area BA. Thus, the alignment mark AM may have a two-dimensional shape, which is defined by the infrared-transmitting area ITA, or defined by the infrared-transmitting area ITA and the light-blocking area BA surrounding the infrared-transmitting area ITA.

In one embodiment, for example, an infrared ray transmittance of the infrared-transmitting area ITA may be about 80% or greater, or about 90% or greater, and a visible ray transmittance of the infrared-transmitting area ITA may be about 10% or less. Since both of the infrared-transmitting area ITA and the light-blocking area BA substantially blocks a visible ray, the infrared-transmitting area ITA and the light-blocking area BA may not be distinguishable from each other by human eyes, and may be perceived as a black. After an infrared ray is irradiated on the alignment mark AM, and when a transmitted infrared ray is sensed by an infrared sensor, an image corresponding to a planar shape of the infrared-transmitting area ITA may be obtained.

In an embodiment, as shown in FIG. 2, the infrared-transmitting area ITA may have a cross shape in a plan view. However, embodiments are not limited thereto. Alternatively, the infrared-transmitting area ITA may be variously modified to have another shape, which may function as an alignment mark.

Referring to FIG. 3, the window cover 10 includes a base substrate 12, a light-blocking layer BL disposed on the base substrate 12 and an infrared-transmitting member ITM, of which at least a portion is inserted into an opening defined through the light-blocking layer BL.

The base substrate 12 may be transparent. In one embodiment, for example, the base substrate 12 may include glass, quartz, a polymeric material or a combination thereof.

The light-blocking layer BL includes a light-blocking material. In one embodiment, for example, the light-blocking layer BL may include a light-blocking material or a carbon-based light-blocking material such as carbon black, a dye, a pigment or a combination thereof. The light-blocking material may be dispersed in a binder polymer. In one embodiment, for example, the light-blocking layer BL may be formed from a black matrix composition which is conventionally known.

In an embodiment, the light-blocking layer BL may have a multi-layered structure. In one embodiment, for example, the light-blocking layer BL may include a first light-blocking layer BL1 and a second light-blocking layer BL2 disposed on the first light-blocking layer BL1. In such an embodiment where the light-blocking layer BL has a multi-layered structure, an entire thickness of the light-blocking layer BL may be increased, thereby obtaining a desired light-blocking ratio (optical density).

An opening may be defined through the light-blocking layer BL. At least a portion of the infrared-transmitting member ITM may be disposed in the opening of the light-blocking layer BL. Thus, the infrared-transmitting area ITA may be defined by the opening. The infrared-transmitting area ITA may transmit an infrared ray. The light-blocking area BA, where the light-blocking layer BL is disposed, may block an infrared ray.

In one embodiment, for example, a first opening is defined through the first light-blocking layer BL1 to correspond to the infrared-transmitting area ITA, and a second opening is defined through the second light-blocking layer BL2 to overlap the first opening. In one embodiment, for example, a width W2 of the second opening may be equal to or greater than a width W1 of the first opening.

The infrared-transmitting member ITM fills the opening of the light-blocking layer BL. In one embodiment, for example, the infrared-transmitting member ITM may extend through the light-blocking layer BL to contact the base substrate 12. A portion of the infrared-transmitting member ITM may cover an upper surface of the light-blocking layer BL. However, embodiments are not limited thereto. Alternatively, the infrared-transmitting member ITM may be entirely disposed inside the opening of the light-blocking layer BL.

In an embodiment, at least a portion of the infrared-transmitting member ITM is inserted in the opening of the light-blocking layer BL. Thus, separation or damage of the infrared-transmitting member ITM by an external force applied thereto in a process of assembling or separating the window cover may be effectively prevented.

In an embodiment, an alignment mark using the infrared-transmitting member ITM may be recognized with a higher accuracy by a sensor when compared to a conventional alignment mark formed using a white ink. Thus, an accuracy of an assembling process may be increased.

In an embodiment, since the infrared-transmitting member ITM substantially blocks a visible ray, the infrared-transmitting member ITM may not be perceived by a user. Thus, an external aesthetic sensibility of a display device including the window cover may be prevented from being deteriorated.

Figure 4:
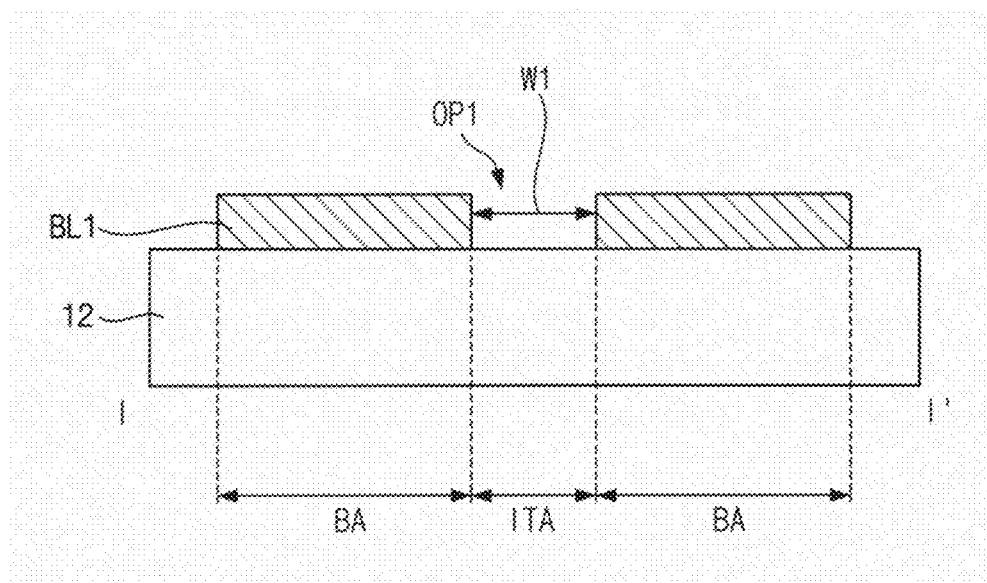
FIGS. 4 and 5 are cross-sectional views illustrating a method for manufacturing a mark according to an embodiment.
Figure 5:
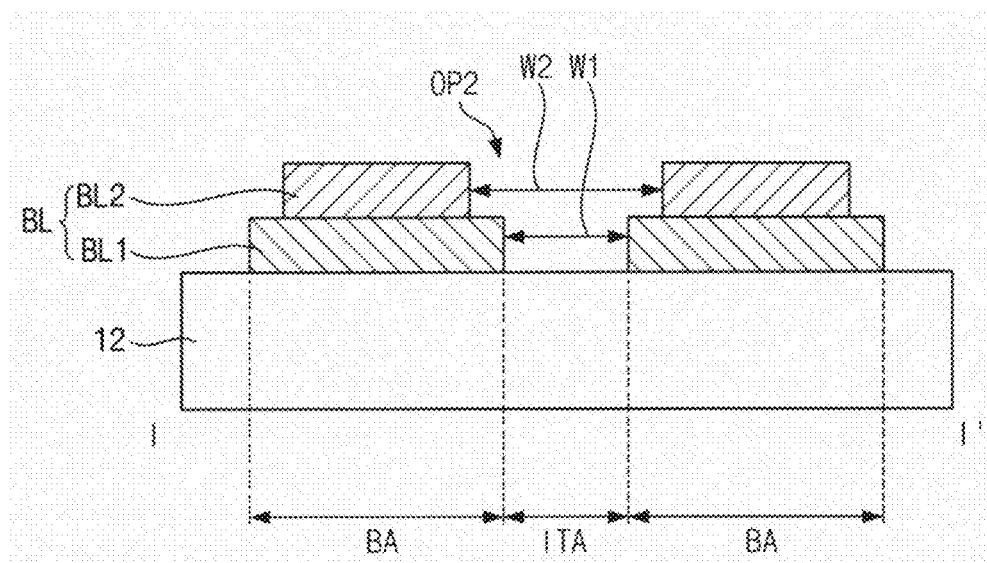

FIGS. 4 and 5 are cross-sectional views illustrating a method for manufacturing a mark according to an embodiment.

Referring to FIG. 4, a first light-blocking layer BL1 is provided or formed on a base substrate 12. A first opening OP1 may be formed in the first light-blocking layer BL1. In one embodiment, for example, a composition including a light-blocking material may be provided on a portion of the base substrate 12 through a screen printing process to form the first light-blocking layer BL1.

Referring to FIG. 5, a second light-blocking layer BL2 is provided or formed on the first light-blocking layer BL1. A second opening OP2 is defined in the second light-blocking layer BL2 to overlap the first opening OP1. In one embodiment, for example, a width W2 of the second opening OP2 may be equal to or greater than a width W1 of the first opening OP1.

Thereafter, an infrared-transmitting composition is provided in the first opening OP1 and the second opening OP2 and then cured to form an infrared-transmitting member ITM illustrated in FIG. 3. In one embodiment, for example, the infrared-transmitting composition may be provided through a screen printing process.

In an embodiment, the infrared-transmitting composition may include at least one selected from various compositions, which are known to form an infrared ray filter.

In one embodiment, for example, the infrared-transmitting composition may include a coloring agent, a binder resin, a cross-linking compound, a polymerization initiator and a solvent.

In one embodiment, for example, the coloring agent may include a dye, a pigment or a combination thereof. In one embodiment, for example, the coloring agent may include a red coloring agent, a blue coloring agent, a green coloring agent, a purple coloring agent, a yellow coloring agent, an orange coloring agent or a combination thereof. The coloring agent may further include a black coloring agent, as desired.

In one embodiment, for example, the binder resin may include a (meth)acrylic resin, an epoxy resin, a polyether resin, a polyarylate resin, a polyether sulfone resin, a polyimide resin, a polycarbonate resin, a polyolefin resin or a combination thereof.

The cross-linking compound (a polymerizable compound) may react with the binder resin to form a cross-linking structure. In one embodiment, for example, the cross-linking compound may contain an acrylate group as a functional group, and may include a mono-functional monomer, a bi-functional monomer, a multi-functional monomer having at least three functional groups or a combination thereof. In one embodiment, for example, the cross-linking compound may include nonylphenyl carbitol acrylate, 2-hydroxy-3-phenoxypropyl acrylate, 2-ethylhexyl carbitol acrylate, 2-hydroxyethyl acrylate, 1,6-hexanediol di(meth)acrylate, ethylene glycol di(meth)acrylate, neopentyl glycol di(meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate or a combination thereof.

In one embodiment, for example, the polymerization initiator may include a photo-polymerization initiator. In one embodiment, for example, the photo-polymerization initiator may include an acetophenone-based compound, a benzophenone-based compound, a triazine-based compound, a biimidazole-based compound, a thioxanthone-based compound, an oximeter-based compound or a combination thereof.

In one embodiment, for example, the solvent may include a glycolether-based solvent, an alcohol-based solvent, a ketone-based solvent, an acetate-based solvent, a cellosolve-based solvent, a hydrocarbon-based solvent or a combination thereof.

Figure 6:
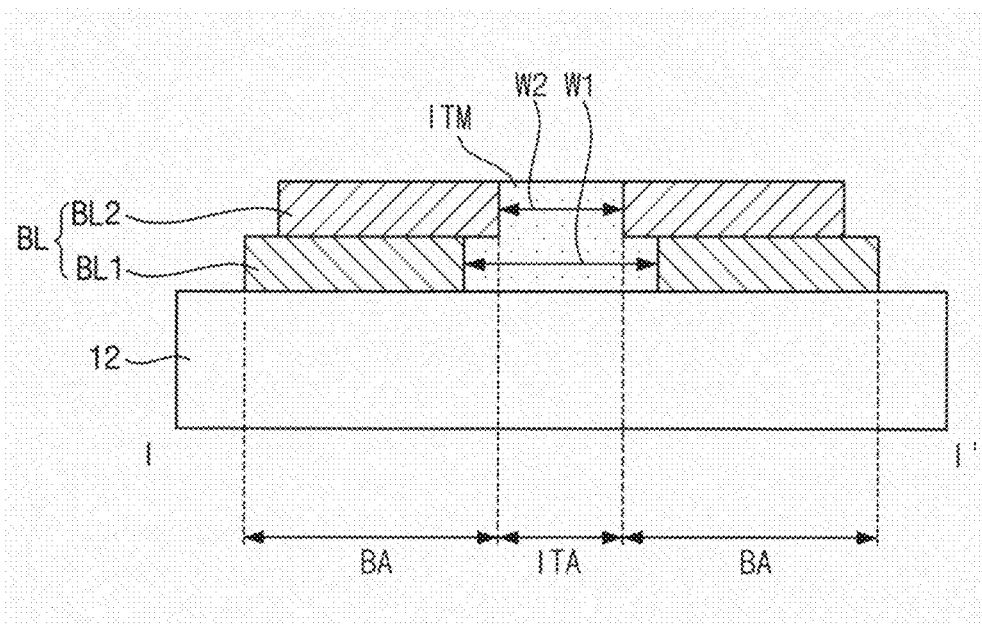
FIGS. 6 and 7 are cross-sectional views illustrating a window cover according to alternative embodiments.
Figure 7:
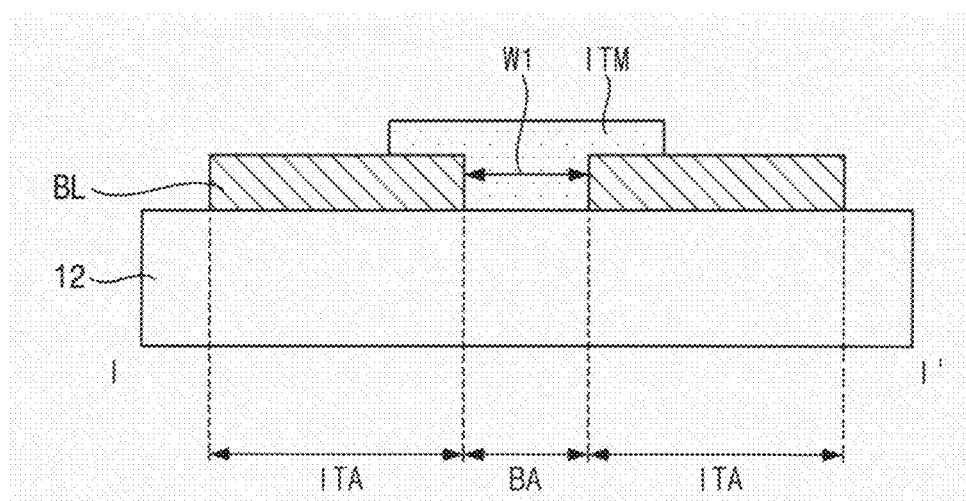
Figure 8:
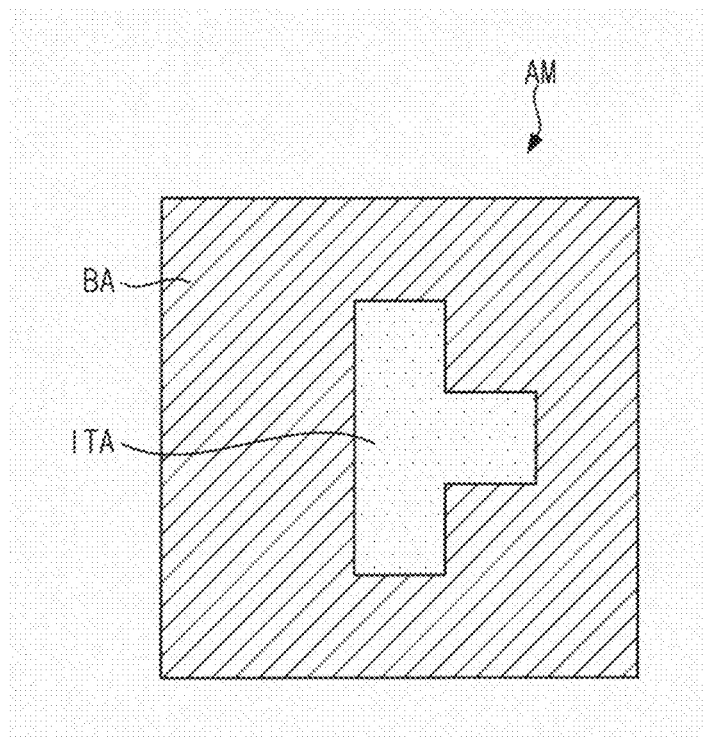
FIGS. 8 and 9 are plan views illustrating an alignment mark of a window cover according to alternative embodiments.
Figure 9:
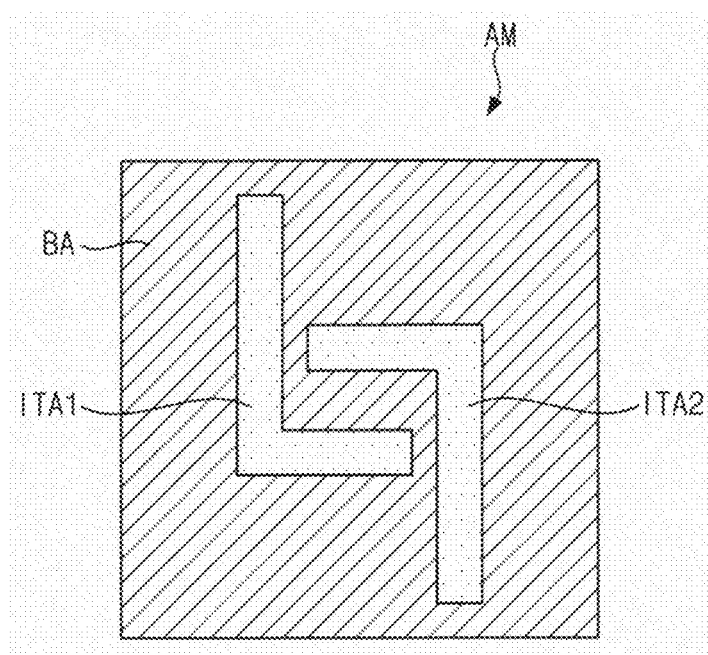

Embodiments of an alignment mark may have various shapes and configurations. FIGS. 6 and 7 are cross-sectional views illustrating a window cover according to alternative embodiments. FIGS. 8 and 9 are plan views illustrating an alignment mark of a window cover according to alternative embodiments.

Referring to FIG. 6, an embodiment of a window cover including an alignment mark includes a base substrate 12, a light-blocking layer BL disposed on the base substrate 12 and an infrared-transmitting member ITM, of which at least a portion is inserted into the light-blocking layer BL.

The light-blocking layer BL may include a first light-blocking layer BL1 and a second light-blocking layer BL2 disposed on the first light-blocking layer BL1. An opening is defined through the light-blocking layer BL. At least a portion of the infrared-transmitting member ITM is disposed in the opening.

In one embodiment, for example, a first opening is defined through the first light-blocking layer BL1, and a second opening is defined through the second light-blocking layer BL2 to overlap the first opening. In one embodiment, for example, a width W2 of the second opening may be equal to or less than a width W1 of the first opening. A planar shape of an infrared-transmitting area ITA may be defined by a second opening of the second light-blocking layer BL2. The light-blocking area BA may surround the infrared-transmitting area ITA.

Referring to FIG. 7, a light-blocking layer BL may have a single-layered structure depending on a thickness thereof or a desired optical density. A light-blocking area BA and an infrared-transmitting area ITA may be defined by the light-blocking layer BA and an opening of the light-blocking layer BL.

Referring to FIG. 8, an infrared-transmitting area ITA of an alignment mark AM may be surrounded by a light-blocking area BA. The infrared-transmitting area ITA may have a bar shape or a rectangular shape with a protrusion.

Referring to FIG. 9, an alignment mark AM may include a plurality of infrared-transmitting areas ITA1 and ITA2, which are spaced apart from each other. The infrared-transmitting areas ITA1 and ITA2 may have a bending shape such as an L-shape, respectively.

Figure 10:
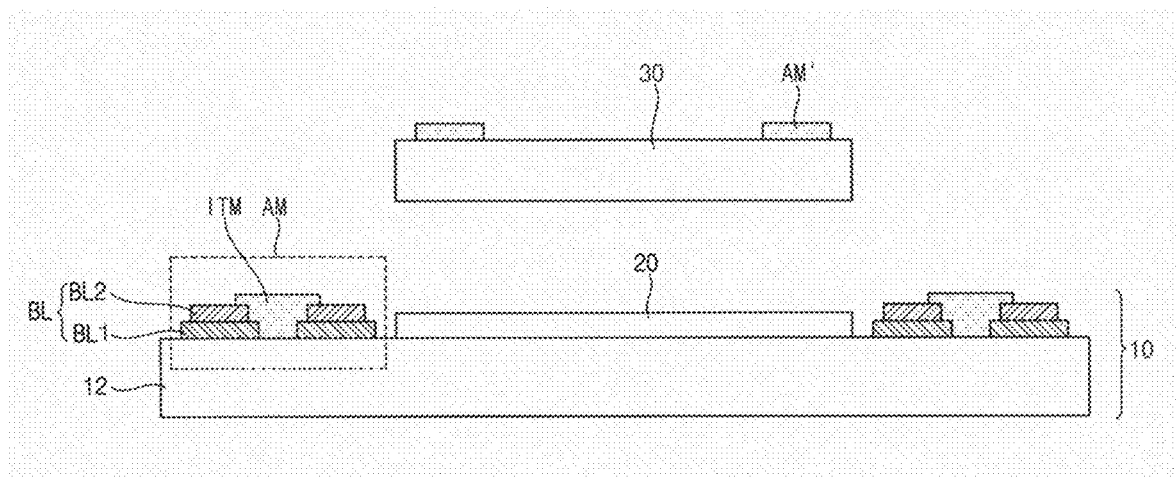
FIGS. 10, 11 and 12 are cross-sectional views illustrating a display device according to an embodiment.
Figure 11:
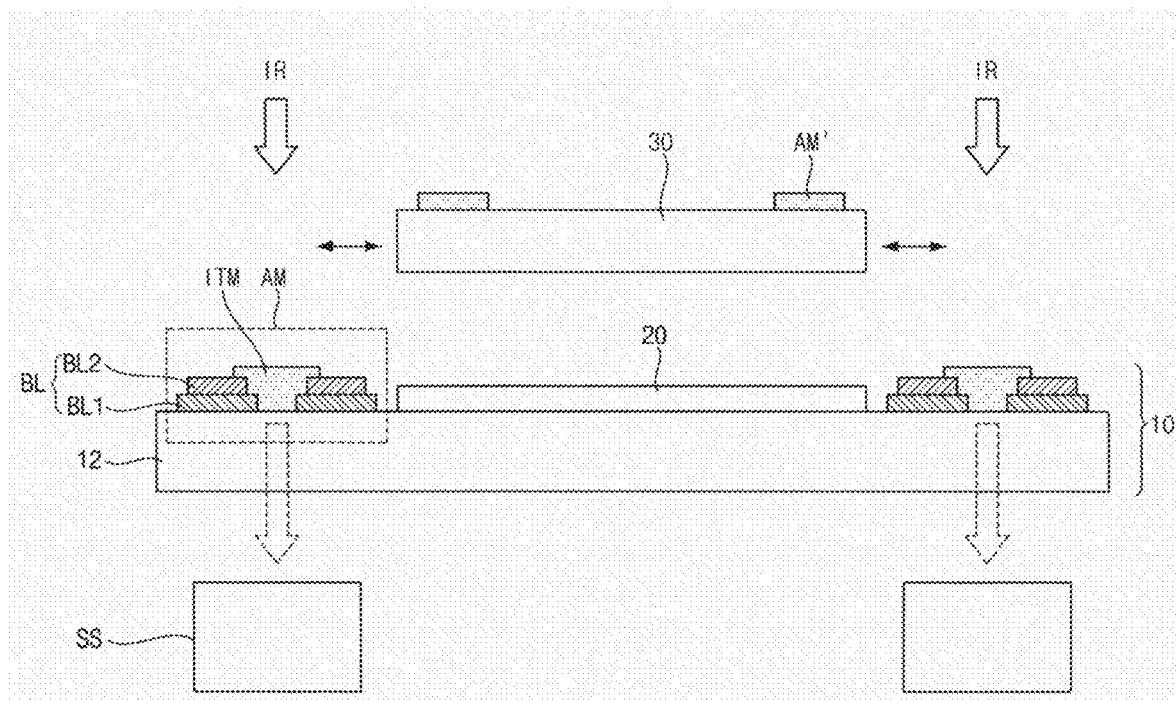
Figure 12:
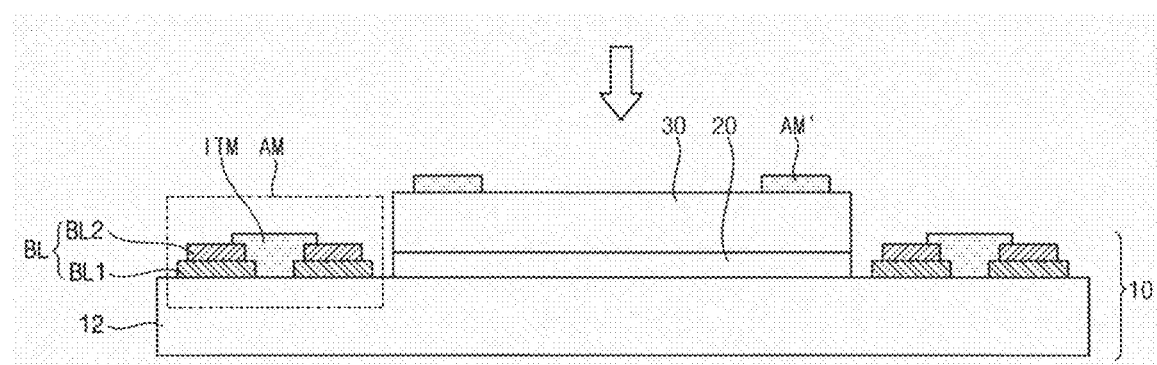

FIGS. 10, 11 and 12 are cross-sectional views illustrating a display device according to an embodiment.

Referring to FIG. 10, a window cover 10 and a display panel 30 are disposed to be spaced apart from each other in a vertical direction. A front surface of the display panel 30, which corresponds to a display surface, is disposed to face the window cover 10.

The window cover 10 may have a substantially same configuration as the window cover illustrated in FIGS. 1 to 3. In one embodiment, for example, the window cover 10 may include an alignment mark AM disposed on an upper surface of a base substrate 12. The alignment mark AM may include a light-blocking layer BL and an infrared-transmitting member ITM, of which at least a portion is disposed in an opening of the light-blocking layer BL.

In an embodiment, as illustrated in FIGS. 10 to 12, the display panel 30 may be disposed on the window cover 10. However, embodiments are not limited thereto. In one alternative embodiment, for example, the display panel 30 may be disposed under the window cover 10.

In one embodiment, for example, the display panel 30 may be an organic light-emitting display panel. However, embodiments are not limited thereto. In one embodiment, for example, the display panel 30 may be one of various types of display panel such as a liquid crystal display panel, a micro light emitting diode ("LED") display panel or the like.

In one embodiment, for example, the display panel 30 may include a panel alignment mark AM'. The panel alignment mark AM' may be disposed on a rear surface of the display panel 30.

An adhesive member 20 may be provided between the window cover 10 and the display panel 30. In one embodiment, for example, the adhesive member 20 may be disposed on an upper surface of the window cover 10.

Referring to FIG. 11, an infrared ray may be irradiated on the alignment mark AM of the window cover 10. The light-blocking layer BL of the alignment mark AM may block an infrared ray IR. The infrared-transmitting member ITM may transmit the infrared ray IR. The infrared ray IR, which has passed through the alignment mark AM, may be detected by an infrared ray sensor SS. In one embodiment, for example, the window cover 10 may include a plurality of alignment marks AM. Thus, a plurality of cover alignment mark images may be obtained.

In an embodiment, a light may be irradiated on the panel alignment mark AM' to obtain an image. The light irradiated on the panel alignment mark AM' may have a wavelength different from the infrared ray. In one embodiment, for example, a sensor for detecting a light reflected by the panel alignment mark AM' may be disposed on a rear surface of the display panel 30. Thus, a plurality of panel alignment mark images may be obtained.

An alignment apparatus for combining the display panel 30 with the window cover 10 may include an analyzing part and a control part. The analyzing part may compare and analyze the cover alignment mark images and the panel alignment mark images to generate an alignment information. The control part may adjust position of the display panel 30 or the window cover 10 based on the alignment information.

The above image-generating process and position-adjusting process may be properly repeated to accurately align the display panel 30 with the window cover 10.

Referring to FIG. 12, the display panel 30 and the window cover 10 are pressed to be combined with each other. The display panel 30 may overlap a transmitting area of the window cover 10. In an embodiment, the display panel 30 may overlap at least a portion of a light-blocking area of the window cover 10.

Embodiments are not limited to an alignment mark and a window cover, and may be applied to various substrates including a mark. In one embodiment, for example, embodiments may include a substrate including an identification mark as a QR code.

Figure 13:
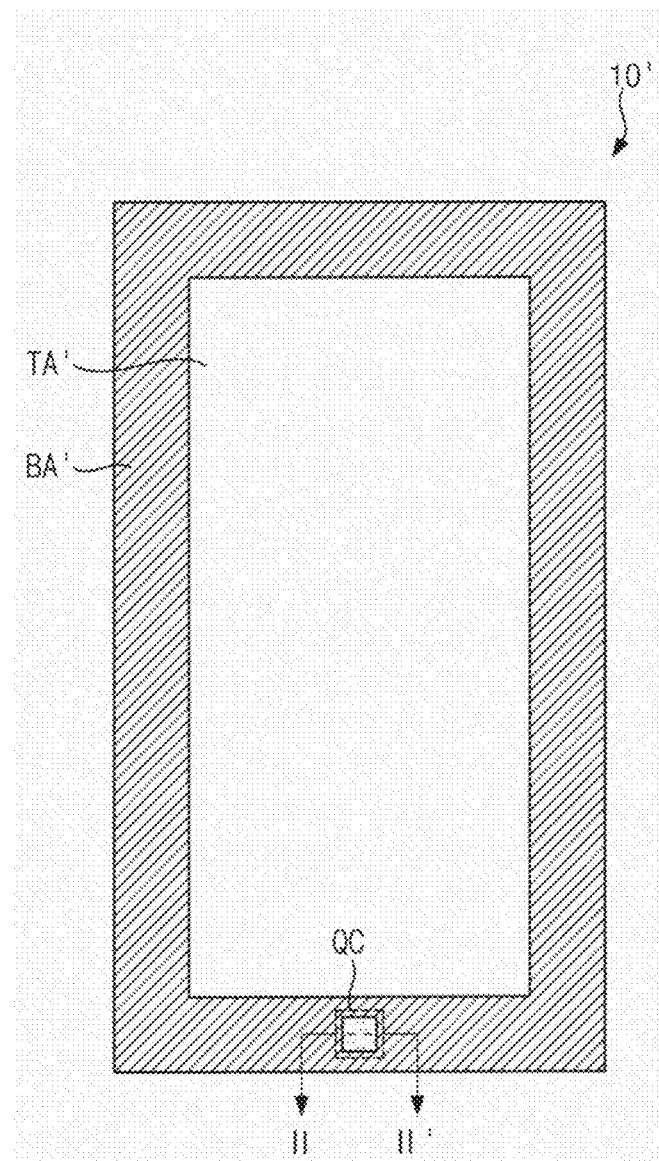
FIG. 13 is a plan view illustrating a window cover according to an alternative embodiment.
Figure 14:
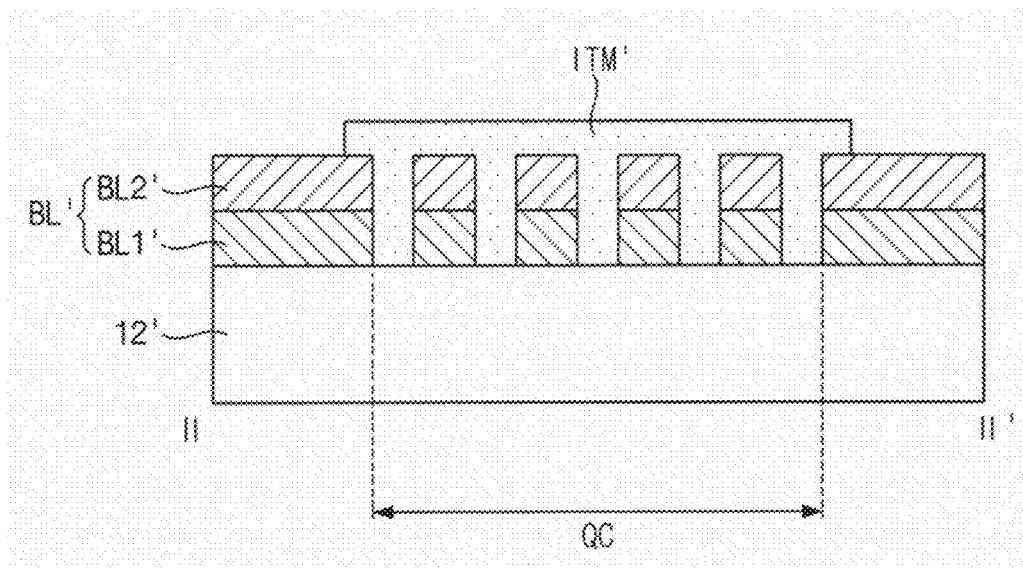
FIGS. 14 and 15 are cross-sectional view taken along line II-II' of FIG. 13.
Figure 15:
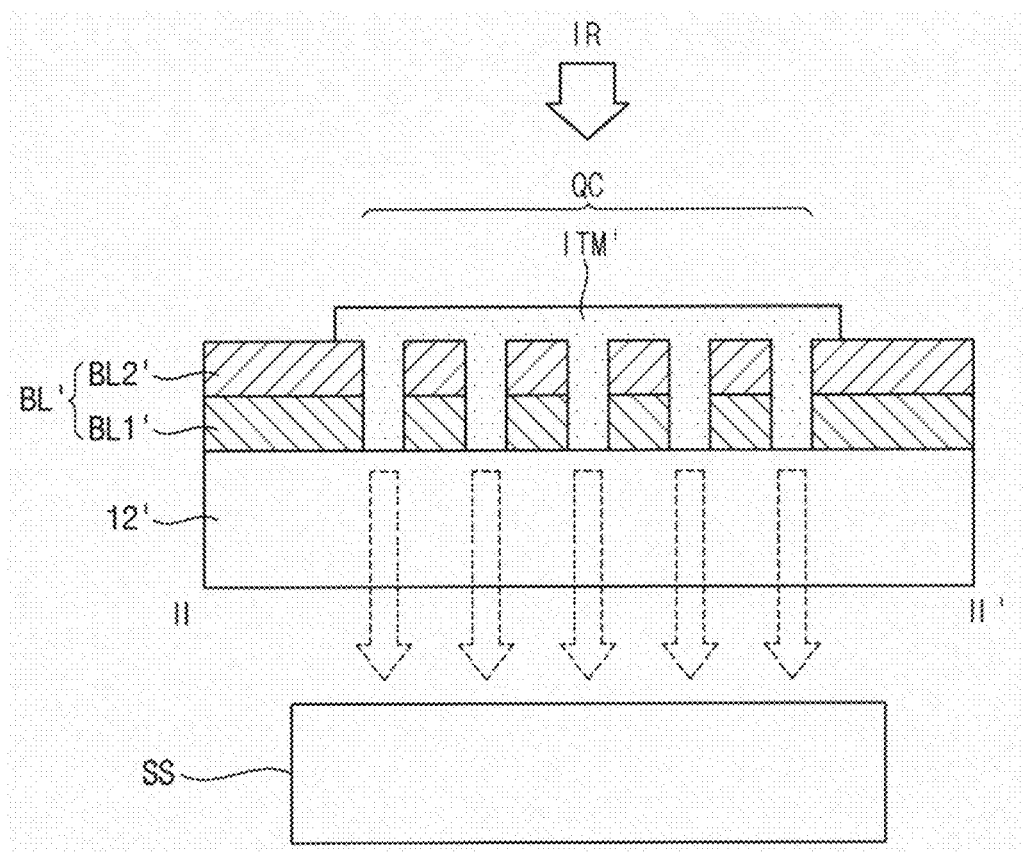
Figure 16:
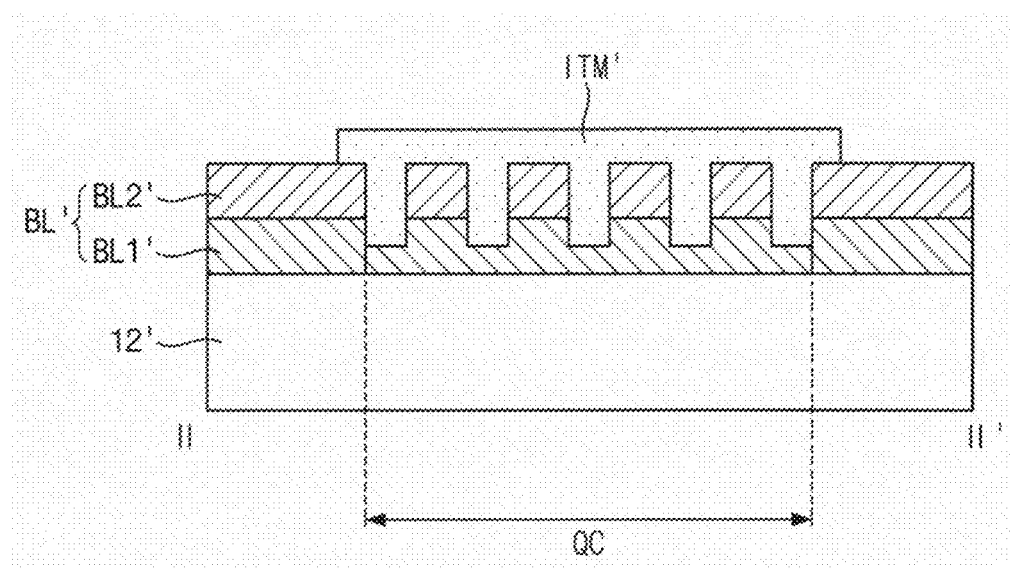
FIG. 16 is a cross-sectional view illustrating a window cover according to an embodiment.

FIG. 13 is a plan view illustrating a window cover according to an alternative embodiment. FIGS. 14 and 15 are cross-sectional view taken along line II-II' of FIG. 13. FIG. 16 is a cross-sectional view illustrating a window cover according to an embodiment.

Referring to FIG. 13, an embodiment of a window cover 10' includes a light-transmitting area TA' and a light-blocking area BA' adjacent to the light-transmitting area TA, in a plan view. In an embodiment, the light-blocking area BA' may surround the light-transmitting area TA'.

In an embodiment, the window cover 10' includes an identification mark QC. In one embodiment, for example, the identification mark QC may be a QR code. A QR code is a two-dimensional code having a lattice pattern, and may include various information. In one embodiment, for example, the identification mark QC may include or store various information, which is written or recorded in the identification mark QC, of the window cover 10' such as a manufacture, a manufactured date, a model number, a product information or the like.

In an embodiment, the identification mark QC may be disposed in the light-blocking area BA'.

Referring to FIG. 14, a window cover including an identification mark includes a base substrate 12', a light-blocking layer BL' disposed on the base substrate 12' and an infrared-transmitting member ITM', of which at least a portion is inserted into the light-blocking layer BL'.

The light-blocking layer BL' may include a first light-blocking layer BL1' and a second light-blocking layer BL2' disposed on the first light-blocking layer BL1'. The light-blocking layer BL' includes a groove corresponding to the identification mark QC. At least a portion of the infrared-transmitting member ITM' is disposed in the groove. In an embodiment, the groove may be defined through the light-blocking layer BL', thereby forming an opening.

In an embodiment, the groove of the light-blocking layer BL' may be formed by a laser-carving process. In one embodiment, for example, the light-blocking layer BL' may be formed on the base substrate 12' and a laser may be irradiated on a portion of the light-blocking layer BL' to form the groove.

A conventional identification mark does not include an infrared-transmitting member. Thus, when a depth of a groove for forming an identification mark is small, a recognition ratio of the identification mark may be reduced. When a depth of a groove is increased, an identification mark may be perceived by a user.

According to an embodiment of the invention, an identification mark is defined by an infrared-transmitting member, and the identification mark may be identified by an infrared ray. Thus, a recognition ratio of an identification mark may be increased while preventing the identification mark from being perceived by a user.

In one embodiment, for example, as illustrated in FIG. 15, when an infrared ray IR is irradiated on the identification mark QC, an infrared ray sensor SS may detect an infrared ray, which has passed through the infrared-transmitting member ITM' overlapping the opening of the light-blocking layer BL1. Thus, an image of the identification mark QC may be obtained.

Referring to FIG. 16, in an embodiment where an identification mark QC is defined, a groove, which does not pass through a light-blocking layer BL' and has a bottom surface spaced apart from a base substrate 12' may be formed by adjusting a carving depth. Thus, an infrared-transmitting member ITM' may be inserted into the groove.

In such an embodiment, although the groove does not pass through the light-blocking layer BL', an image of the identification mark QC may be obtained by an infrared-transmitting difference or a reflectance difference between the groove and an area adjacent to the groove.

Embodiments are not limited to manufacturing an electronic device including a display device. Embodiments may be used for aligning or identifying various articles.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A mark substrate comprising:
   a base substrate;
   a light-blocking layer disposed on the base substrate, wherein an opening or a groove is defined in the light-blocking layer;
   an infrared-transmitting member, wherein at least a portion of the infrared-transmitting member is disposed in the opening or the groove of the light-blocking layer to define a mark having a two-dimensional shape and optically distinguished from an adjacent area,
   wherein a portion of the infrared-transmitting member contacts and covers an upper surface of the light-blocking layer.

2. The mark substrate of claim 1, wherein the light-blocking layer includes a first light-blocking layer and a second light-blocking layer disposed directly on the first light-blocking layer.

3. The mark substrate of claim 2, wherein a width of an opening of the first light-blocking layer is less than a width of an opening of the second light-blocking layer.

4. The mark substrate of claim 2, wherein a width of an opening of the first light-blocking layer is greater than a width of an opening of the second light-blocking layer.

5. The mark substrate of claim 1, wherein
   an infrared ray transmittance of the infrared-transmitting member is about 80% or greater, and
   a visible ray transmittance of the infrared-transmitting member is about 10% or less.

6. The mark substrate of claim 5, wherein the infrared-transmitting member includes a coloring agent.

7. The mark substrate of claim 1, wherein the mark has a shape of an alignment mark.

8. The mark substrate of claim 1, wherein the mark is an identification mark including an information.

9. The mark substrate of claim 8, wherein the identification mark is a QR code.

10. A window cover comprising:
a base substrate;
a light-blocking layer disposed on the base substrate and surrounding a transmitting area of the base substrate; and
an infrared-transmitting member, wherein at least a portion of the infrared-transmitting member is inserted into the light-blocking layer to define a mark having a two-dimensional shape and optically distinguished from an adjacent area,
wherein a portion of the infrared-transmitting member contacts and covers an upper surface of the light-blocking layer.

11. The window cover of claim 10, wherein the light-blocking layer includes an opening or a groove, in which the at least a portion of the infrared-transmitting member is disposed.

12. The window cover of claim 10, wherein the light-blocking layer includes a multi-layered structure.

13. The window cover of claim 10, wherein
an infrared ray transmittance of the infrared-transmitting member is about 80% or greater, and
a visible ray transmittance of the infrared-transmitting member is about 10% or less.

14. The window cover of claim 10, wherein the mark has a shape of an alignment mark.

15. The window cover of claim 10, wherein the mark is a QR code.

16. A display device comprising:
a window cover including a light-blocking area and a transmitting area; and
a display panel combined with the window cover and overlapping the transmitting area,
wherein the window cover includes:
a base substrate;
a light-blocking layer disposed on the base substrate and overlapping the light-blocking area; and
an infrared-transmitting member, wherein at least a portion of the infrared-transmitting member is inserted into the light-blocking layer to define a mark having a two-dimensional shape and optically distinguished from an adjacent area,
wherein a portion of the infrared-transmitting member contacts and covers an upper surface of the light-blocking layer.

17. The display device of claim 16, wherein the light-blocking layer includes an opening or a groove, in which the at least a portion of the infrared-transmitting member is disposed.

18. The display device of claim 16, wherein the mark has a shape of an alignment mark.

19. The display device of claim 16, wherein the mark is a QR code.

* * * * *